United States Patent
Wang et al.

(10) Patent No.: US 8,880,548 B2
(45) Date of Patent: Nov. 4, 2014

(54) DYNAMIC SEARCH INTERACTION

(75) Inventors: Ye-Yi Wang, Redmond, WA (US); Robert L. Rounthwaite, Fall City, WA (US); Scott K. Imig, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 12/706,719

(22) Filed: Feb. 17, 2010

(65) Prior Publication Data
US 2011/0202533 A1    Aug. 18, 2011

(51) Int. Cl.
*G06F 17/30* (2006.01)

(52) U.S. Cl.
CPC ...... *G06F 17/30864* (2013.01); *G06F 17/3064* (2013.01)
USPC ............................ 707/767; 707/766; 707/771

(58) Field of Classification Search
None
See application file for complete search history.

(56) References Cited

U.S. PATENT DOCUMENTS

| | | | |
|---|---|---|---|
| 6,012,055 A * | 1/2000 | Campbell et al. ................. | 1/1 |
| 6,029,172 A * | 2/2000 | Jorna et al. ...................... | 1/1 |
| 6,505,194 B1 * | 1/2003 | Nikolovska et al. .......... | 707/768 |
| 6,564,213 B1 * | 5/2003 | Ortega et al. .................... | 1/1 |
| 7,599,918 B2 | 10/2009 | Shen et al. | |
| 7,676,462 B2 * | 3/2010 | Kirkland et al. ....... | 707/999.005 |
| 7,676,517 B2 * | 3/2010 | Hurst-Hiller et al. ......... | 707/713 |
| 7,792,803 B2 * | 9/2010 | Ikeyama ....................... | 707/672 |
| 7,792,816 B2 | 9/2010 | Funes et al. | |
| 7,970,764 B1 * | 6/2011 | Ershov .......................... | 707/736 |
| 8,024,327 B2 | 9/2011 | Tunkelang et al. | |
| 8,055,638 B2 * | 11/2011 | Schechter et al. ............ | 707/705 |
| 8,176,068 B2 * | 5/2012 | Kunjithapatham et al. ... | 707/766 |
| 8,229,948 B1 * | 7/2012 | Ershov .......................... | 707/765 |
| 8,280,721 B2 | 10/2012 | Snow et al. | |
| 8,280,783 B1 * | 10/2012 | Brownell et al. ............ | 705/27.1 |
| 8,281,238 B2 * | 10/2012 | Sweeney et al. ............. | 715/273 |
| 8,290,944 B2 * | 10/2012 | Murdock et al. .............. | 707/726 |
| 8,386,509 B1 * | 2/2013 | Scofield et al. ............... | 707/769 |
| 2002/0161752 A1 * | 10/2002 | Hutchison ......................... | 707/3 |
| 2005/0289100 A1 * | 12/2005 | Dettinger et al. ................. | 707/1 |
| 2006/0004850 A1 * | 1/2006 | Chowdhury ............. | 707/103 R |
| 2006/0064411 A1 | 3/2006 | Gross et al. | |
| 2006/0074870 A1 * | 4/2006 | Brill et al. ......................... | 707/3 |
| 2006/0136403 A1 | 6/2006 | Koo | |
| 2007/0078822 A1 * | 4/2007 | Cucerzan et al. ................ | 707/3 |
| 2008/0065617 A1 * | 3/2008 | Burke et al. ...................... | 707/5 |
| 2008/0092044 A1 * | 4/2008 | Lewis et al. .................. | 715/713 |
| 2008/0104037 A1 | 5/2008 | Bierner | |

(Continued)

OTHER PUBLICATIONS

Cui et al, "Probabilistic Query Expansion Using Query Logs", 2002.*

(Continued)

*Primary Examiner* — Polina Peach
(74) *Attorney, Agent, or Firm* — Dan Choi; Judy Yee; Micky Minhas

(57) ABSTRACT

This patent application pertains to dynamic search interaction. One example includes an organizational component configured to obtain a search query from a user. The organizational component can also be configured to obtain related search queries. The organizational component can further be configured to organize the related search queries by topic and to estimate a relative likelihood that an intent of the user matches an individual topic. This example also includes an image generation component configured to cause the organized related search queries to be presented on a graphical user interface (GUI) in a manner that reflects the relative likelihood.

20 Claims, 7 Drawing Sheets

(56) References Cited

U.S. PATENT DOCUMENTS

| | | |
|---|---|---|
| 2008/0104061 A1* | 5/2008 | Rezaei ............................. 707/5 |
| 2008/0120276 A1 | 5/2008 | Chennavasin |
| 2008/0177734 A1* | 7/2008 | Schwenke et al. ................ 707/5 |
| 2009/0006383 A1* | 1/2009 | Tunkelang et al. ............... 707/5 |
| 2009/0083261 A1* | 3/2009 | Nagano et al. .................... 707/5 |
| 2009/0228439 A1 | 9/2009 | Manolescu et al. |
| 2009/0240672 A1* | 9/2009 | Costello ............................ 707/4 |
| 2009/0265631 A1* | 10/2009 | Sigurbjornsson et al. .... 715/716 |
| 2010/0070484 A1* | 3/2010 | Kraft et al. .................... 707/706 |
| 2010/0161620 A1* | 6/2010 | Lamere et al. ............... 707/749 |
| 2011/0029500 A1* | 2/2011 | Brown et al. ................. 707/706 |
| 2011/0161311 A1* | 6/2011 | Mishne et al. ................ 707/719 |

OTHER PUBLICATIONS

Hu, et al., "Understanding User's Query Intent with Wikipedia", Retrieved at <<http://www2009.eprints.org/48/1/p471.pdf>>, Proceedings of the 18th international conference on World wide web, Apr. 20-24, 2009, pp. 471-480.

Slawski, Bill., "How Search Engines May Try to Match Searchers' Intents from Analysis of Search Engine Query Logs", Retrieved at <<http://www.seobythesea.com/?p=1180>>, Feb. 13, 2009, pp. 9.

* cited by examiner

DYNAMIC SEARCH INTERACTION

BACKGROUND

Web search queries are one of the most common uses of computing devices. Yet, users often cannot get the information that they want in a single search query. Instead, users tend to enter a preliminary search query, examine the results, and refine their search etc. in a reiterative process until the desired information is obtained. This reiterative search and refine process tends to produce a less than satisfying user experience.

SUMMARY

This patent application pertains to dynamic search interaction. One example includes an organizational component configured to obtain a search query from a user and related search queries. The organizational component is also configured to organize the related search queries by topic and to estimate a relative likelihood that an intent of the user matches an individual topic. This example also includes an image generation component configured to cause the organized related search queries to be presented on a graphical user interface (GUI) in a manner that reflects the relative likelihood.

The above listed example is provided for introductory purposes and does not include all of and/or limit the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application pertains to computing scenarios that allow users to more readily find desired information. More specifically, some of the present implementations can aid a user by suggesting search queries (hereinafter. "queries") for the user in a manner that can reduce user effort to find desired information.

Figure 1:
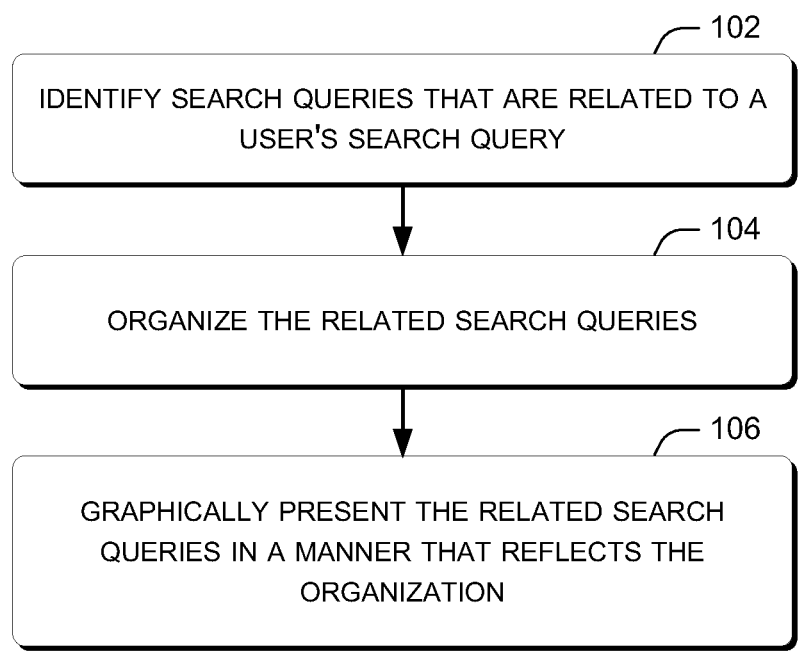
FIGS. 1 and 7 are flow charts for accomplishing dynamic search interaction concepts.

FIG. 1 offers an introductory query presentation method 100. At block 102, when a user enters a query, related queries can be identified. The related queries can aid the user in obtaining the user's intended results. Stated another way, the related queries can aid the user in obtaining the user's desired results in a reduced number of steps and/or can provide contextual information for the user.

At block 104, the related queries can be organized based upon one or more parameters. For instance, the related queries can be organized by topic. Alternatively or additionally, the related queries can be organized by time or geographic location, among others. At block 106, the related queries can be graphically presented to the user in a manner that conveys the organization. Alternatively or additionally, the related queries can be presented in a manner that conveys a relative likelihood that individual topics and/or related queries within a topic match the user's intent that led the user to enter the original query.

Figure 2:
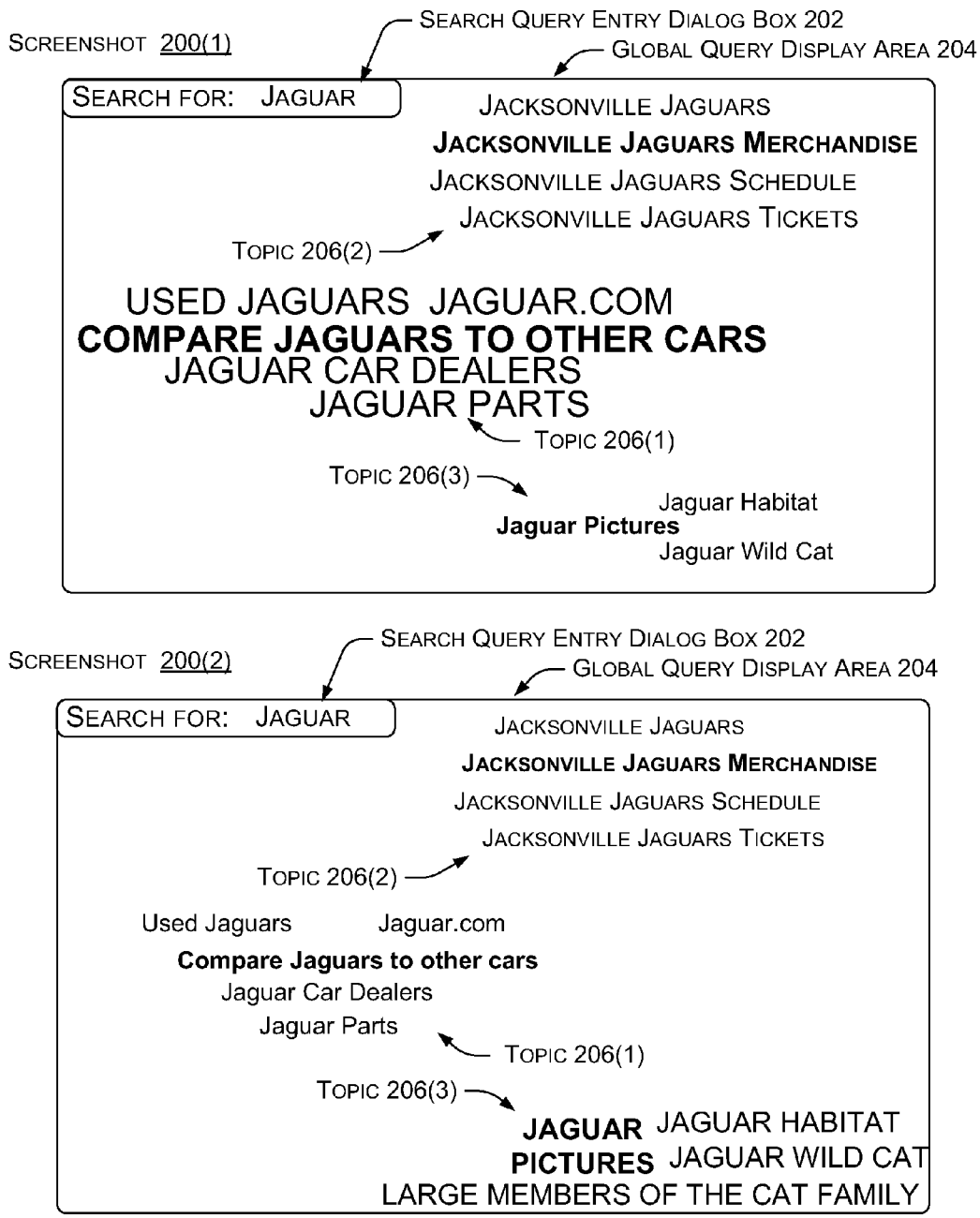
FIGS. 2 and 3 are graphical user-interface screenshots that can be generated in accordance with the present dynamic search interaction concepts in some implementations.

For introductory explanation purposes consider a web search scenario associated with FIG. 2 which shows screenshots 200(1) and 200(2). Individual screenshots can include a search query entry dialog box 202 and a global query display area 204. Assume that screenshot 200(1) is generated responsively to a user entering a web search query of "jaguar" in the search query entry dialog box 202. In a general sense, the global query display area 204 is populated with related search queries that may be useful to the user. Within the global query display area, the results are organized into three topics 206(1), 206(2), and 206(3). In this example, the first topic 206(1) relates to jaguar cars (Jaguar is a trademarked car brand), the second topic 206(2) relates to the Jacksonville Jaguars football team (Jacksonville Jaguars is a trademarked football team brand). The third topic 206(3) relates to the animal species jaguar. This organizational feature can be useful in that queries are often ambiguous. In such a case, grouping the related queries by topic can allow the user to quickly grasp the ambiguity. This can allow the user to more readily locate related queries that can aid the user in achieving the intent (i.e., the purpose of entering the query).

Further, global query display area 204 shows a relative likelihood or probability that the user's intent relates to an individual topic. For example, in this case, related queries associated with the first topic 206(1) are shown in the relatively larger text or font size, related queries of the second topic 206(2) are shown in a relatively mid-size text, and related queries of the third topic 206(3) are shown in a relatively small text. Further, in this case, the topics are distinguished by text case. For instance, related queries of the first topic 206(1) are shown in all capitals, related queries of the second topic 206(2) are shown in small capitals, and related queries of the third topic 206(3) are shown in normal letters. Thus, the first topic 206(1) is identified as potentially matching the user's intent with a higher probability than the other two topics 206(2), 206(3). Likewise, the third topic 206(3) is identified with the lowest potential probability of the three topics for matching the user's intent.

Within an individual topic 206(1)-206(3) individual related search queries can be distinguished from one another based on relative probability of satisfying the user's intent. For instance, relative to topic 206(1) the related query "compare jaguars to other cars" is shown in bold text where other related queries are shown in standard text. Thus, the related query "compare jaguars to other cars" is assigned a higher likelihood of matching the user intent than other related queries within topic 206(1) and/or other related queries generally. As such, the related query "compare jaguars to other cars" is displayed in a manner which is intended to be easily noticeable by the user. In this example, bold text is used for individual related queries of a topic to indicate a higher relative likelihood of matching the user's intent. This is, of course, just one example for indicating relative likelihood within a topic. In another case, font size could be adjusted for the related queries of a topic to indicate relative likelihood. For instance, a related query with a higher relative likelihood could be assigned a relatively larger font size than another related query with a lower relative likelihood.

Screenshot 200(2) serves to show one example of the dynamic nature of some of the present implementations. Assume that upon viewing screenshot 200(1), the user indicated that he/she is interested in topic 206(3). For instance, the user may hover his/her cursor (not shown) over topic 206(3). This additional user input can be utilized to refine the presentation of the related queries. For instance, in screenshot 200(2) the relative text sizes of the topics 206(1)-206(3) have been updated based upon the user input. At this point, topic 206(3) is displayed with more prominence and topics 206(1) and 206(2) are displayed with less prominence. Also, the related queries of topic 206(3) are now shown in capital letters and the related queries of topic 206(1) are shown in normal letters. Further, since it now appears more likely that the user's intent relates to topic 206(3)—the animal species jaguar; an additional related search query of "large members of the cat family" has been added to topic 206(3).

While the relative presentations of the topics have been adjusted in screenshot 200(2), the user is still presented with a global view of the three topics 206(1)-206(3). Accordingly, if the user fails to find the desired related query in topic 206(3), the user can still see the other topics and their related queries.

Considered from another perspective, screenshots 200(1) and 200(2) can serve to illustrate an example of how the present implementations can offer dynamic interactions with the user. For instance, the user can drill down to select his/her specific intent while maintaining an overview of the related search results offered in the global query display area 204. For example, when the user hovers the mouse on top of an individual region or topic, that topic can be in focus and zoomed in, while the other topics can be zoomed out—yet still remain on the global query display area. Such a configuration can allow the user to keep a global view of the related queries offered in the global query display area. Thus, the user can still visit a different topic. In some implementations, the user can also use the mouse wheel to further zoom in to see more detailed views of the topic in focus, including more related queries. In doing so, the user does not need a series of clicks to locate the specific queries he/she is looking at in the related query results. Thus, with these implementations, the user remains oriented via the global view and does not have to switch between multiple screens.

In summary, related queries for the user's query can be initially organized and weighted based upon probability of matching user intent. Subsequent user actions can be considered to dynamically recalculate or otherwise refine the user intent and present the related queries in a more meaningful manner and/or present more germane query options. This can be achieved while maintaining an overall view in the global query display area 204 so that the user can see multiple (and in some instances all) topics and related queries rather than just those related to a selected topic.

It should be noted that this example uses relative text size and standard text versus bold text to indicate relative probabilities of matching user intent. Other techniques can alternatively or additionally be employed, such as different types of text (i.e., font), colors of text, underlining, location on the global query display area (i.e., central versus peripheral), etc., to indicate relative probabilities of matching user intent.

Summarizing further, the global query display area 204 can also graphically convey an estimated relative likelihood that an individual topic matches the user's intent. The user's actions relative to the global query display area can be used to dynamically update the global query display area to aid the user in locating the desired information.

Figure 3:
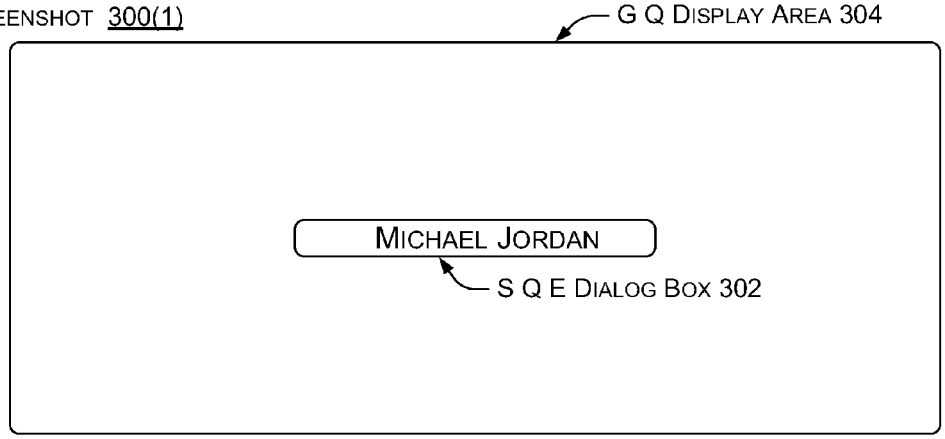
Figure 3:
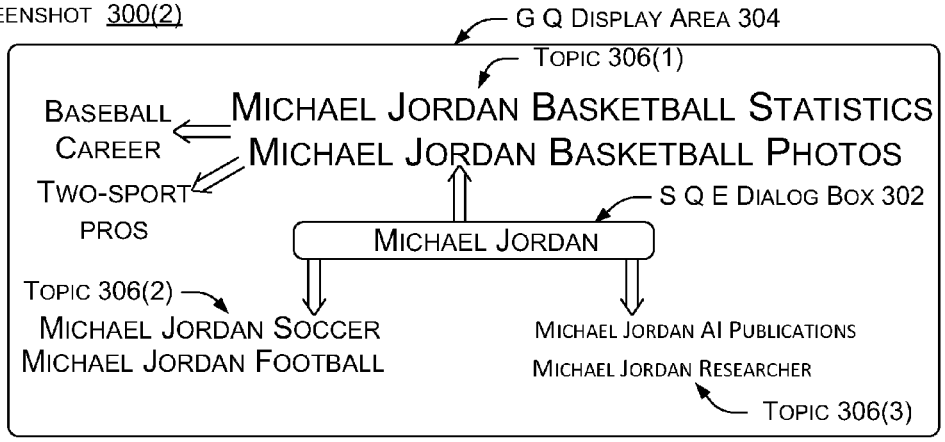
Figure 3:
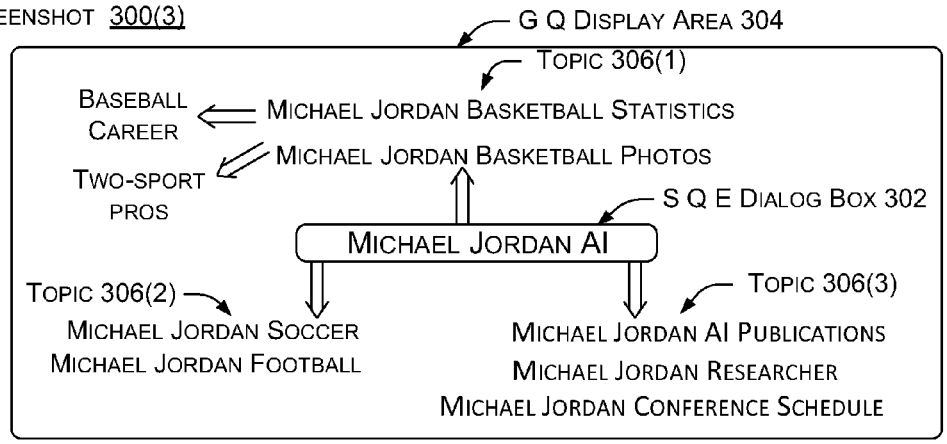

FIG. 3 shows a set of screenshots 300(1), 300(2), and 300(3) that provide another example of dynamically updateable query display techniques. These screenshots include a search query dialog box 302 and a global query display area 304. Screenshot 302(1) is an initial view where the user enters the query "Michael Jordan" in the search query entry dialog box 302.

Screenshot 302(2) shows global query display area 304 populated with related queries organized by topic. Here, the first topic 306(1) relates to Michael Jordan the basketball player. The second topic 306(2) relates to Michael Jordan the football (i.e., soccer) player. The third topic relates to Michael Jordan the Artificial Intelligence researcher. (Please note that each of these individuals has rights associated with their names/identities. The names are used here only to provide an example of the type of queries that users often enter. There is no implied relationship between the present applicant and these individuals).

As presented in screenshot 300(2), topic 306(1) is shown in larger font that the other topics. The larger font size can indicate a higher probability that the user will be interested in these related queries than those of the other topics 306(2) and/or 306(3). Further note that topics are distinguished from one another by different font styles. For instance, related queries of topic 306(1) are shown in Arial font. Related queries of topic 306(2) are shown in New Times Roman font. Related queries of topic 306(2) are shown in Calibri font. Assume, however, that the user subsequently updates his/her search query from "Michael Jordan" to "Michael Jordan AI". This change is reflected in the search query entry dialog box 302 of screenshot 300(3). This screenshot has also been dynamically updated based upon the user input. Now, the related search queries of topic 306(3) have been increased in relative size. Further, an additional related search query of "Michael Jordan Conference Schedule" has been added to topic 306(3).

In summary, initially, the related queries associated with Michael Jordan the basketball player can be rated or ranked higher than those of the other topics based upon some indicia that the user is more likely to select one of these related queries than those related to the other topics. However, this initial rating can be dynamically updated based upon subsequent information, such as subsequent user input. This ranking facet is discussed in more detail below relative to FIGS. 4-5. Briefly, the probabilities can be based upon previous actions by the user and/or query logs of other users, among others.

In this example, the search query entry dialog box 302 is centrally located in the global query display area 304. The topics are then presented as nodes around the search query entry dialog box. Thus, this configuration can provide a visual organization that is centered around the user input so that the user can readily see related queries that may be of interest.

In summary, users often cannot get the information they are looking for through a single search query in a web search. The present concepts can identify the user's intents through the interactions with the user. The present concepts provide a search and browsing model that allows users to specify their intents through a dynamic interface that leverages various graphical user interface (GUI) attributes. Examples of these GUI attributes are described above relative to the screenshots and can include, but are not limited to, spatial aspects, font size, and/or color information to allow the user to quickly find and specify his/her intents by selecting an individual related query. A potentially key property of such an interface is its dynamic nature, which can allow users to drill down to the specific information they are interested in while having a global view of the intent space (i.e., global query display area), so they would not get lost during the interactions.

Please note that while FIGS. 2-3 show three topics of related queries, in any given instance, the number of topics may be one, two, three, four, or more. Note further, that while the screenshots illustrated in FIGS. 2-3 emphasize the global display area, in other instances, the global display area may share the GUI with other areas. For example, in some implementations, the global display area may occupy an upper portion of the GUI while search results, for example, occupy a lower portion. The skilled artisan should recognize other scenarios that can utilize the concepts described above and below relative to the global display area to create an enhanced user experience. Further still, while the above described examples are organized by topic, other examples can be organized based upon other parameters, either alone or in combination with topic.

First Dynamic Search Interaction Example

Figure 4:
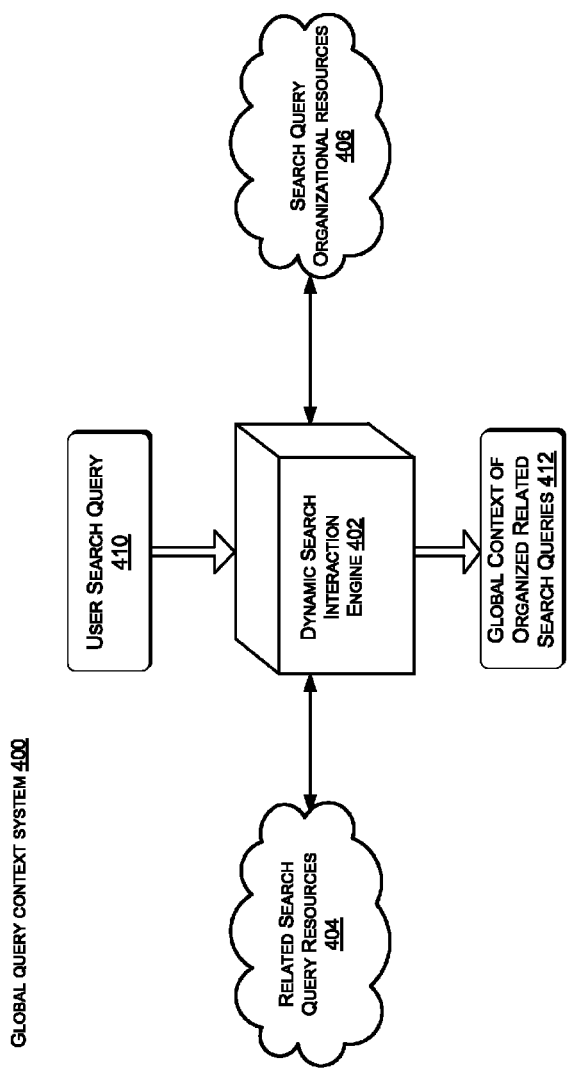
FIGS. 4-6 illustrate dynamic search interaction systems in accordance with some of the present concepts.

FIG. 4 shows an example global query context system 400. In this case, global query context system 400 includes a dynamic search interaction engine 402, related search query resources 404, and search query organizational resources 406. Briefly, the dynamic search interaction engine 402 can receive a user query 410 and output a global context of organized related queries 412.

In one implementation, the related search query resources 404 can be manifested as query search logs from the user and/or from other users. Briefly, an entry in a query search log can show an initial query that a user entered and then how the user refined the search query one or more times to achieve a final query.

The search query organizational resources 406 can be resources that can provide disambiguation information. These resources can be leveraged to distinguish between ambiguous terms. For instance, many online websites, such as online dictionaries and reference sites include disambiguation information. For instance, Wikipedia (a trademarked website) includes a disambiguation feature for many terms. In another randomly chosen example, the website dictionary.com (a trademarked website) defines ten different instances of the term "Columbia".

For purposes of explanation, global query context system 400 will now be explained in the context of the examples described above relative to FIG. 2. Recall that the user initially entered the query "jaguar". The dynamic search interaction engine 402 can receive the query and then access one or more related search query resources 404 to obtain related search log entries. For instance, the search log entries may indicate that a previous user who initially entered the query "jaguar" subsequently refined his/her query to "jaguar car dealers" while another user refined his/her query from "jaguar" to "Jacksonville jaguars", etc. Of course, this is a simplified example and the search log entries may contain millions of entries related to jaguar and how the user(s) modified the query and the resultant final query. Alternatively, the probabilities can be estimated by counting the number of visits to each webpage related to a specific topic without leveraging the query session log. For example, Wikipedia may have an internal page for each topic, and inside the Wikipedia internal page there are also links to the external (non-Wikipedia) pages for the specific topic.

Further, the dynamic search interaction engine 402 can track the relative number of instances where an initial query culminated in a final query. This information can be used to determine relative probabilities that the users intent matches an individual related query. The dynamic search interaction engine 402 can utilize the refined and/or final queries from the search logs as the related queries displayed above relative to FIG. 2.

The dynamic search interaction engine 402 can also access the search query organization resources 406. Assume for purposes of explanation that in this case, an accessed search query organization resource, such as a dictionary web-site defines three different instances of "jaguar". One defined instance relating to cars, another to a wild animal, and the third relating to a football team. The dynamic search interaction engine 402 can use the three defined instances (i.e., definitions) to define the three topics 206(1)-206(3) identified above relative to FIG. 2. The dynamic search interaction engine 402 can compare the definitions to the related queries to identify which related queries are associated with an individual topic. For instance, assume that one of the dictionary instances defines "jaguar" as a brand of car or automobile. Further, recall that relative to "jaguar" one of the related queries is "jaguar car dealers". In this case, "jaguar brand of car or automobile" is going to have a relatively high degree of similarity to "jaguar car dealers". The dynamic search interaction engine 402 can utilize this relatively high degree of similarity as an indication that the related query "jaguar car dealers" may be associated with the topic of jaguar as a brand of cars or automobile. The same type of processing can be completed for the other related searches and topics. The dynamic search interaction engine 402 can generate a presentation format that conveys the organization. Examples of such configurations are illustrated above relative to FIGS. 2-3.

Note further, that in some implementations the dynamic search interaction engine 402 may consider multiple parameters for organizing related queries. For example, in some mobile device cases, related queries may be organized based upon location and/or location and topic. Another aspect of interest is that previous (and/or subsequent) query entries may be assigned equal weights or may be weighted differently. For instance, some implementations may weight queries that were entered by users that are in the same social network or geographical location as the user higher than queries from other locations or other users.

Figure 5:
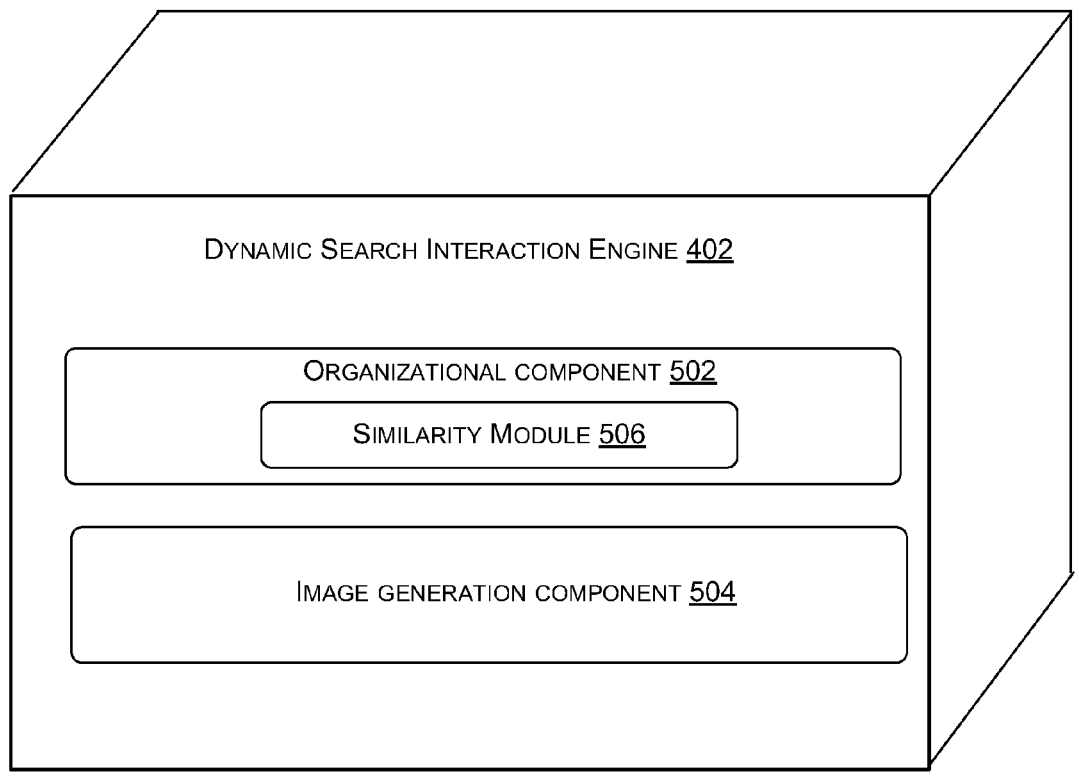

FIG. 5 offers an example implementation of dynamic search interaction engine 402. In this case, the dynamic search interaction engine includes an organization component 502 and an image generation component 504. Further, the organization component 502 includes a similarity module 506.

Organizational component 502 can be configured to obtain the user's query. The organization component can then obtain related queries, such as from query logs. The organization component can organize the related queries in some manner to provide a context for the user. For instance, the organization component can access a disambiguation resource for the user's query and identify topics based upon entries found in the disambiguation resource. Such an example is described above relative to FIG. 4.

The organization component 502 can also estimate a relative likelihood that an intent of the user matches an individual topic utilizing some type of statistical analysis. For instance, the organization component can identify the number of instances where an initial query of the query logs resulted in an individual related query as the ultimate query. These instances can be compared to determine relative probabilities of a match between the user's intent when entering the query and the individual related query. These initial probabilities can be dynamically updated based upon subsequent user interactions. For instance, if the user subsequently hovers over the related queries of an individual topic, their relative probabilities may go up relative to related queries of other topics. Further, the user's own history and/or preferences may be considered when determining the relative probabilities. For instance, assume that the query logs indicate that users who initially entered "jaguar" selected a "Jacksonville Jaguar football team" related topic 70% of the time. However, further assume that the user's history indicates that the user does not go to sports related sites. In such a case, the related queries associated with the "Jacksonville Jaguar football team" may be reduced relative to related queries of other topics.

In some cases, the organizational component 502 can utilize the similarity module 506 to identify the relative probabilities that the user's query matches a related query and/or that a related query matches an identified topic. For instance, statistical learning can be used for sense disambiguation. For example, a related query can be assigned to a topic(s), so the related query can be put in the appropriate topic on the global query display area.

For those related queries that are not readily discernable from a disambiguation reference (e.g., jaguar car pictures), another technique can be employed to determine an association with a topic. This can be achieved by comparing the distribution of clicked URLs associated with the related query and the distribution associated with another query that matches (potentially best matches) the topic.

In one case a query similarity metric can be employed. Briefly, in this context, a similarity metric can be thought of as a measure of common purpose or intent between two queries. Some implementations can initially identify seed related queries for each topic. These seed queries can allow comparison to other potential related queries for possible addition to the topic. Some of the these implementations can leverage a search query organizational resources, such as for example Wikipedia. In the Wikipedia example, the similarity module can use Wikipedia's internal/external links for a topic and look for queries in the query log that have frequent and concentrated clicks to these links.

One similarity metric employs a click-graph. A click graph can be thought of as a giant bipartite graph of queries and URLs, based on click data from search engine logs. In this scenario, edges of the graph represent clicks and are weighted by frequency. Every search and every click can generate data for this graph. One implementation can utilize a distributional similarity over the query click graph, rather than a graph distance measure, or a random walk.

For purposes of explanation consider that a Cosine similarity can relate to queries Qa and Qb. In one implementation, the following equation can be employed:

$$\frac{\sum_i P(U_i | Q_A) P(U_i | Q_B)}{\sqrt{\sum_i P(U_i | Q_A)^2 \sum_i P(U_i | Q_A)^2}}$$

In this case, each pair of queries has a similarity measure, but in practice, only those that are somewhat similar may be calculated. This can still be a very large number of pairs. The above information can be utilized by the organizational component 502 to identify the topics for the user's query and to associate related queries with individual topics. Of course this is but one technique for detecting similarity that can be utilized in various implementations. Other distribution similarity measures can be used, either separately or combined with a statistical model like logistic regression.

Image generation component 504 can be configured to cause the organized related search queries to be presented on a graphical user interface (GUI) in a manner that reflects the relative likelihood. For instance, the screenshots displayed relative to FIG. 2, show what might be referred to as a blob type approach. In this approach related queries associated with an individual topic are arranged together as a blob that can be distinguished in some manner from related queries associated with other topics. The screenshots associated with FIG. 3 show an alternative approach where the topics are shown in a node like manner. In such an approach, additional degrees of granularity of a topic can be represented by sub-nodes. Thus, the user can readily see the relationship of a sub-node of a topic to the main topic on the global query display area.

Second Dynamic Search Interaction Example

Figure 6:
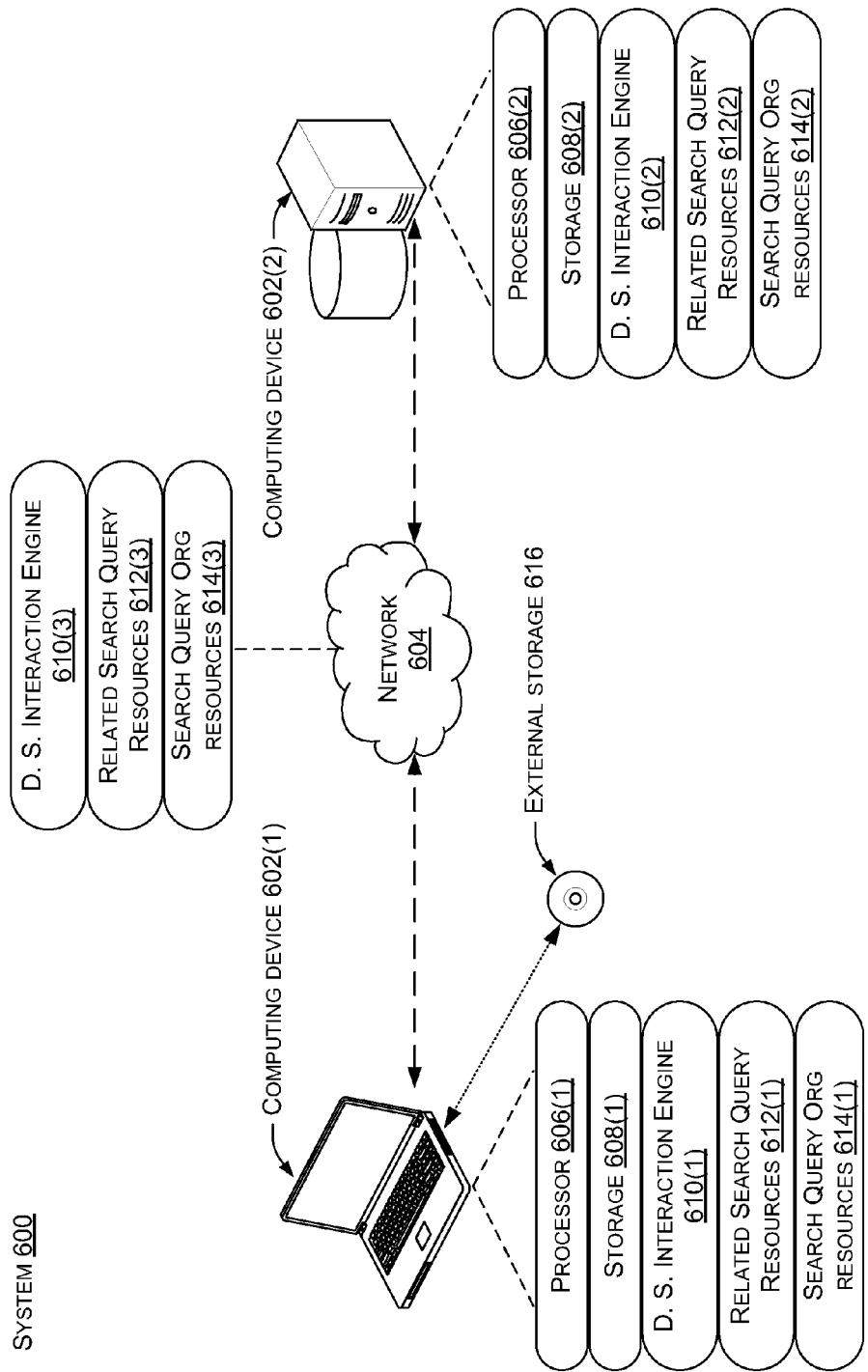

FIG. 6 shows a system 600 that is configured to accomplish the dynamic search interaction concepts described above and below. In this case, system 600 includes first and second computing devices 602(1) and 602(2). The computing devices can exchange data over a network 604. Individual computing devices can function in a stand-alone or cooperative manner to achieve dynamic search interaction detection.

In this case, each of computing devices 602(1) and 602(2) can include a processor 606, storage 608, a dynamic search interaction engine 610, related search query resources 612, and search query organizational resources 614.

Processor 606 can execute data in the form of computer-readable instructions to provide a functionality. Data, such as computer-readable instructions can be stored on storage 608. The storage can include any one or more of volatile or non-volatile memory, hard drives, and/or optical storage devices (e.g., CDs, DVDs etc.), among others. The computing devices can also be configured to receive and/or generate data in the form of computer-readable instructions from an external storage mechanism 616. Examples of external storage mechanisms can include optical storage devices (e.g., CDs, DVDs etc.), hard drives, and flash storage devices (e.g., memory sticks or memory cards), among others. The computing devices may also receive data in the form of computer-readable instructions over network 604 that is then stored on the computing device for execution by its processor.

Dynamic search interaction engine 610 can be an organizational component configured to obtain a query from a user and related queries. The dynamic search interaction engine 610 can organize the related queries by topic and estimate a relative likelihood that an intent of the user matches an individual topic. Toward this end the dynamic search interaction engine 610 can access the related search query resources 612 and/or the search query organizational resources 614. Examples of such resources are described above relative to FIGS. 4-5.

As mentioned above, either of computing devices 602(1) and 602(2) can function in a stand-alone configuration. For instance, dynamic search interaction engine 610(1), related search query resources 612(1), and search query organizational resources 614(1) can exist on computing device 602(1) (and/or external storage mechanism 616). In such a case, a user query can be entered on computing device 602(1). The dynamic search interaction engine 610(1) can utilize the related search query resources 612(1) and search query organizational resources 614(1) to generate a global display area such as is described above relative to FIGS. 2-3.

In another scenario, the dynamic search interaction engine 610, related search query resources 612, and search query organizational resources 614 can be distributed. For instance, in one such example, the dynamic search interaction engine 610(1) can exist on computing device 602(1) which is engaged by a user. Upon receiving a user query, the dynamic search interaction engine 610(1) can access related search query resources 612(2) and search query organizational resources 614(2) on computing device 602(2). The dynamic search interaction engine 610(1) can utilize information obtained from these remote resources to generate a global display area. The global display area can then be presented on computing device 602(1) for the user.

In still another scenario, computing device 602(1) can be a thin computing device with limited storage and/or processing resources. In such a case, processing and/or data storage can occur on computing device 602(2) (and/or upon a cloud of unknown computers connected to network 604). Results of the processing can then be sent to and displayed upon computing device 602(1) as a global display area for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single device or over multiple devices.

Dynamic Search Interaction Method Example

Figure 7:
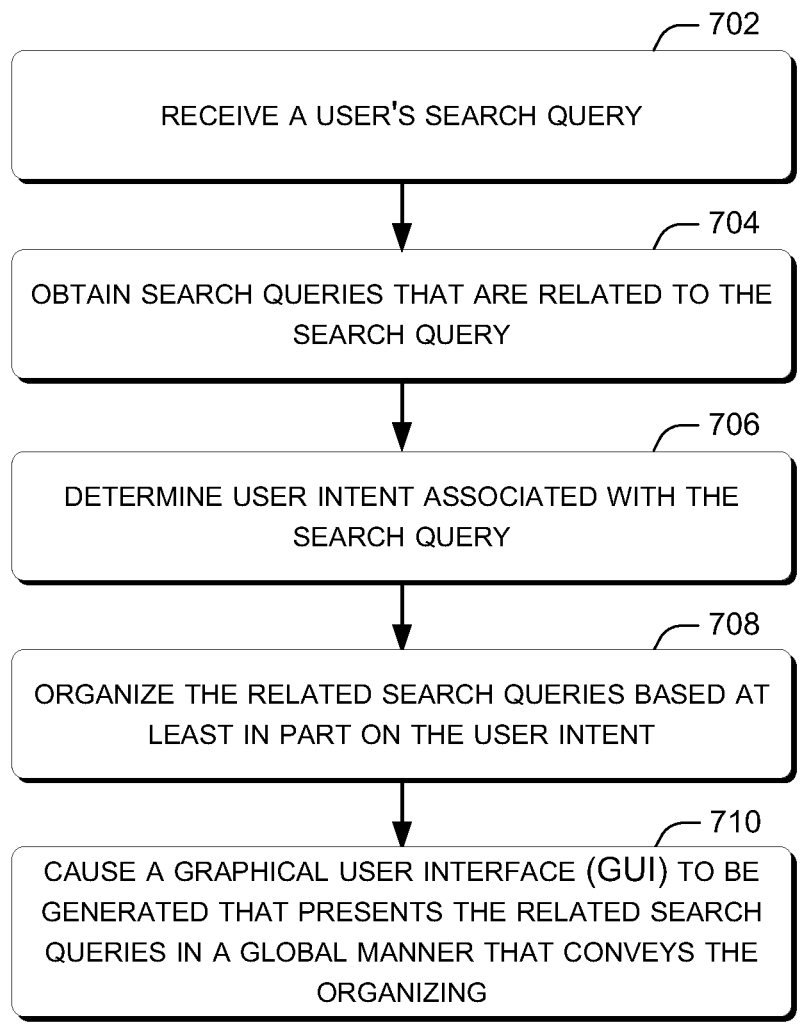

FIG. 7 illustrates a flowchart of a process, technique, or method 700 that is consistent with at least some implementations of the present dynamic search interaction concepts.

Block 702 receives a user's search query. Users often do not know how to formulate their queries to effectively get the exact information they desire. However, their queries often "locate" in the same area as their exact intent. The blocks below can aid the user to identify a query that matches his/her intent.

Block 704 obtains search queries that are related to the search query. For instance, the related search queries may be obtained from the user's history and/or query logs of other users, among others.

Block 706 determines user intent associated with the search query. Various techniques can be employed to determine the user intent. For instance, various resources, such as web-sites can clarify potential ambiguity of the user's query. In another instance, query logs and/or the user's own history can be utilized to aid in determining the user intent.

Block 708 organizes the related search queries based at least in part on the user intent. The related search queries can be organized by topic. For instance, the user's search query may be ambiguous in that it can relate to multiple different topics. The organization can be based upon these topics.

Block 710 causes a graphical user interface (GUI) to be generated that presents the related search queries in a manner that conveys the organizing. In one example, the related search queries are associated with individual topics identified in the organizing. Thus, the user can locate, for example, topics that match his/her original intent and then examine the related queries of that topic to identify an individual related query that matches his/her intent. This can be accomplished while allowing the user to see the other topics to provide an overall context to the related queries available.

In summary, the dynamic search interaction concepts can provide users with a search and browsing experience and can allow the users to specify their intents by browsing through a global query display area or space. The global query display area or space can organize related queries, such as by topic and/or popularity. The user can visualize which topic matches his/her intent and the related queries associated with the topic while maintaining a global view of the other related queries.

The order in which the above listed methods are described is not intended to be construed as a limitation, and any number of the described blocks or acts can be combined in any order to implement the method, or an alternate method. Furthermore, the method can be implemented in any suitable hardware, software, firmware, or combination thereof such that a computing device can implement the method and/or cause the method to be implemented. In one case, the method is stored on a computer-readable storage media as a set of instructions such that execution by a computing device causes the method to be performed.

CONCLUSION

Although techniques, methods, devices, systems, etc., pertaining to offering dynamic search interaction to satisfy user-intent are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:

a hardware processor; and hardware storage storing computer-readable instructions which, when executed by the hardware processor, cause the hardware processor to:

obtain an input search query from a user, the input search query comprising an input search term, identify instances where other users have used the input search term in other search queries and added additional search terms to the other search queries to obtain refined search queries, wherein the refined search queries were previously entered by the other users, organize the refined search queries that were previously entered by the other users into at least multiple first refined search queries associated with a first topic and multiple second refined search queries associated with a second topic, estimate a first relative likelihood that an intent of the user matches the first topic, estimate a second relative likelihood that the intent of the user matches the second topic, the first relative likelihood being greater than the second relative likelihood, cause the multiple first related refined search queries that were previously entered by the other users to be displayed on a graphical user interface (GUI) concurrently with the multiple second refined search queries that were previously entered by the other users, the multiple first refined search queries being displayed relatively more prominently than the multiple second refined search queries to show that the first relative likelihood that the intent of the user matches the first topic is greater than the second relative likelihood that the intent of the user matches the second topic, and responsive to a scrolling action of a user input device, display additional first refined search queries associated with the first topic on the GUI while continuing to display the multiple second refined search queries associated with the second topic, wherein the additional first refined search queries were also previously entered by the other users by adding further additional search terms to the input search term.

2. The system of claim 1, wherein the computer-readable instructions further cause the hardware processor to:
refine one or more of the first relative likelihood or the second relative likelihood based upon subsequent user input so that the second relative likelihood is greater than the first relative likelihood, and dynamically update the GUI so that the multiple second refined search queries that were previously entered by the other users are displayed relatively more prominently than the multiple first refined search queries that were previously entered by the other users to show that the second relative likelihood is greater than the first relative likelihood.

3. The system of claim 1, wherein the computer-readable instructions further cause the hardware processor to:
responsive to a hovering action of the user input device over the multiple first refined search queries that were previously entered by the other users, zoom in on the multiple first refined search queries.

4. The system of claim 3, wherein the scrolling action occurs after the hovering action.

5. The system of claim 4, wherein the user input device is a mouse that performs the hovering action, the mouse having a scroll wheel that performs the scrolling action.

6. A method performed by at least one computing device, the method comprising:
obtaining an input search query from a user, the input search query comprising an input search term;
identifying instances where other users have used the input search term in other search queries and added additional search terms to the other search queries to obtain refined search queries, wherein the refined search queries were previously entered by the other users;
organizing the refined search queries that were previously entered by the other users into at least multiple first refined search queries associated with a first topic and multiple second refined search queries associated with a second topic;
estimating a first relative likelihood that an intent of the user matches the first topic;
estimating a second relative likelihood that the intent of the user matches the second topic, the first relative likelihood being greater than the second relative likelihood; and
causing the multiple first refined search queries that were previously entered by the other users to be displayed on a graphical user interface (GUI) concurrently with the multiple second refined search queries that were previously entered by the other users, the multiple first refined search queries being displayed relatively more prominently than the multiple second refined search queries to show that the first relative likelihood that the intent of the user matches the first topic is greater than the second relative likelihood that the intent of the user matches the second topic.

7. The method of claim 6, wherein:
the estimating the first relative likelihood comprises tracking first instances where the multiple first refined search queries were used as first final queries by the other users to culminate corresponding first searches; and
the estimating the second relative likelihood comprises tracking second instances where the multiple second refined search queries were used as second final queries by the other users to culminate corresponding second searches.

8. The method of claim 7, further comprising:
reducing the first relative likelihood responsive to a determination that the user does not frequently access web sites associated with the first topic.

9. The method of claim 6, wherein identifying the instances where other users have used the input search term in other queries comprises evaluating one or more query logs.

10. The method of claim 6, wherein organizing the refined search queries comprises consulting a disambiguation reference to determine that a particular first refined search query is associated with the first topic and that a particular second refined search query is associated with the second topic.

11. The method of claim 10, further comprising:
determining that other first refined search queries and other second refined search queries do not have readily discernable topics using the disambiguation reference;
comparing first distributions of first clicked resource locators for the other first refined search queries to a corresponding first distribution of the particular first refined search query to determine that the other first refined search queries match the first topic; and
comparing second distributions of second clicked resource locators for the other second refined search queries to a corresponding second distribution of the particular second refined search query to determine that the other second refined search queries match the second topic.

12. A hardware computer-readable storage media having instructions stored thereon that, when executed by a computing device, cause the computing device to perform acts comprising:
obtaining an input search query from a user, the input search query comprising an input search term;
identifying instances where other users have used the input search term as an initial search query and added additional search terms to the initial search query to obtain refined search queries, wherein the initial search query and the refined search queries were previously entered by the other users;
organizing the refined search queries that were previously entered by the other users into at least multiple first refined search queries that were entered by first other users and that are associated with a first topic and multiple second refined search queries that were entered by second other users and that are associated with a second topic;
estimating a first relative likelihood that an intent of the user matches the first topic;
estimating a second relative likelihood that the intent of the user matches the second topic, the first relative likelihood being greater than the second relative likelihood; and
causing the multiple first refined search queries that were previously entered by the first other users to be displayed on a graphical user interface (GUI) concurrently with the multiple second refined search queries that were previously entered by the second other users, the displayed GUI indicating that the first relative likelihood that the intent of the user matches the first topic is greater than the second relative likelihood that the intent of the user matches the second topic.

13. The hardware computer-readable storage media of claim 12, the acts further comprising:
identifying a first seed query associated with the first topic and a second seed query associated with the second topic;

comparing the refined search queries to the first seed query to identify the multiple first refined search queries associated with the first topic; and comparing the refined search queries to the second seed query to identify the multiple second refined search queries associated with the second topic.

14. The hardware computer-readable storage media of claim 13, wherein:

comparing the refined search queries to the first seed query comprises employing a click graph to determine first similarities between the multiple first refined search queries and the first seed query, and comparing the refined search queries to the second seed query comprises employing the click graph to determine second similarities between the multiple second refined search queries and the second seed query.

15. The hardware computer-readable storage media of claim 12, the acts further comprising:

detecting a scrolling input while the multiple first refined search queries that were entered by the first other users and the multiple second refined search queries that were entered by the second other users are concurrently displayed on the GUI; and responsive to the scrolling input, displaying additional first refined search queries that were also entered by the first other users while continuing to display both the multiple first refined search queries and the multiple second refined search queries.

16. The hardware computer-readable storage media of claim 15, the acts further comprising:

detecting a mouse input indicating that the multiple first refined search queries are in focus; and displaying the additional first refined search queries when the multiple first refined search queries are in focus and the scrolling input is detected.

17. The hardware computer-readable storage media of claim 16, the acts further comprising:

detecting another mouse input indicating that the multiple second refined search queries are in focus and that the multiple first refined search queries are no longer in focus;

detecting another scrolling input while the multiple first refined search queries and the multiple second refined search queries are concurrently displayed on the GUI; and responsive to the another scrolling input, displaying additional second refined search queries while continuing to display both the multiple first refined search queries and the multiple second refined search queries.

18. The hardware computer-readable storage media of claim 12, the acts further comprising:

identifying multiple final queries that the other users entered by further refining the initial search query, wherein the multiple first refined search queries include first final queries from the multiple final queries and the multiple second refined search queries include second final queries from the multiple final queries.

19. The hardware computer-readable storage media of claim 12, wherein estimating the first relative likelihood comprises counting numbers of visits to various webpages related to the first topic.

20. The hardware computer-readable storage media of claim 12, wherein organizing the refined search queries comprises:

comparing the refined search queries to a first definition for the input search term to identify the multiple first refined search queries; and comparing the refined search queries to a second definition for the input search term to identify the multiple second refined search queries.

* * * * *